United States Patent [19]

Karasawa et al.

[11] Patent Number: 4,879,328
[45] Date of Patent: Nov. 7, 1989

[54] AROMATIC POLYESTER COMPOSITION AND PROCESS FOR PRODUCING THE SAME

[75] Inventors: Hiroo Karasawa; Kiichi Kometani; Kiyomi Okita, all of Nagoya, Japan

[73] Assignee: Toray Industries, Tokyo, Japan

[21] Appl. No.: 193,951

[22] Filed: May 13, 1988

[30] Foreign Application Priority Data

| May 18, 1987 [JP] | Japan | 62-119057 |
|---|---|---|
| Jul. 10, 1987 [JP] | Japan | 62-173438 |
| Jul. 10, 1987 [JP] | Japan | 62-173439 |

[51] Int. Cl.⁴ ............... C08K 5/15; C08L 67/04
[52] U.S. Cl. ........................ 524/109; 524/303; 524/304; 525/67; 525/113; 525/116; 525/118; 525/119; 525/120; 525/121; 525/122; 525/438
[58] Field of Search .......... 524/109, 303, 304; 528/100, 98; 525/67, 113, 116, 118, 119, 120, 121, 122

[56] References Cited

U.S. PATENT DOCUMENTS

| 3,222,420 | 12/1965 | Heppolette | 525/122 |
|---|---|---|---|
| 3,560,605 | 2/1971 | Siggel et al. | 525/438 |
| 4,130,549 | 12/1978 | Ueno et al. | 528/100 |
| 4,130,601 | 12/1978 | Ohoka et al. | 525/438 |
| 4,222,928 | 9/1980 | Kawamura et al. | 525/438 |
| 4,308,195 | 12/1981 | Mayer et al. | 528/100 |
| 4,331,782 | 5/1982 | Linden | 528/100 |
| 4,348,500 | 9/1982 | Robeson et al. | 525/438 |
| 4,699,942 | 10/1987 | Weaver et al. | 524/304 |

FOREIGN PATENT DOCUMENTS

| 53-132034 | 11/1978 | Japan | 525/438 |
|---|---|---|---|
| 1224684 | 3/1971 | United Kingdom | 524/109 |

*Primary Examiner*—Veronica P. Hoke
*Attorney, Agent, or Firm*—Austin R. Miller

[57] ABSTRACT

Disclosed is a polyester composition comprising (a) 100 parts by weight of an aromatic polyester; (b) 0.005-10 parts by weight of an epoxy compound of the formula (I):

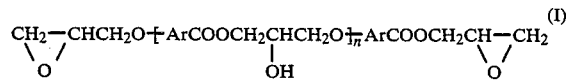

(wherein Ar means $C_6$–$C_{20}$ aromatic group or $C_6$–$C_{20}$ alicyclic group, n means an integer of 0–20); and (c) 1–70 parts by weight of at least one elastomer which has at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, the elastomer having a tensile modulus of 1–6,000 kg/cm². The polyester resin composition of the present invention can easily be molded and the obtained molded article excells in mechanical properties such as impact strength. The obtained molded article also excells in flowability and residence stability during the molding, and in hydrolysis stablity, resistance to thermal cycling and in weatherability.

31 Claims, No Drawings

AROMATIC POLYESTER COMPOSITION AND PROCESS FOR PRODUCING THE SAME

BACKGROUND OF THE INVENTION

I. Field of the Invention

This invention relates to an aromatic polyester composition. More particularly, this invention relates to an aromatic polyester composition and preparation method thereof, which has excellent mechanical properties such as impact strength, which is excellent in flowability and residence stability in molding, and which has excellent hydrolysis stability, resistance to thermal cycling and weatherability.

II. Description of the Prior Art

Aromatic polyesters represented by polyethylene terephthalate and polybutylene terephthalate are widely used in electric and electronic parts and automobile parts because of their excellent properties. However, aromatic polyesters have intrinsic drawbacks in that they have tendency to decompose during molding and have low hydrolysis stability. Further, as an automobile part, it is increasingly important that the mechanical properties of the automobile parts are not degraded after thermal cycling is repeated. However, since aromatic polyesters have poor resistance to thermal cycling, their use is restricted when used as an underhood part of an automobile. As to the improvement of the hydrolysis stability, it has been proposed to add an epoxy compound or an oxazoline compound to the aromatic polyesters. In particular, the method disclosed in Japanese Patent Disclosure (Kokai) No. 82148/80, in which a divalent epoxy compound such as diglycidyl terephthalate is added is relatively more excellent than other methods since the improvement in the hydrolysis stability is greater than those obtained by other methods. However, the resin composition obtained by this method has a drawback in that the flowability and residence stability during molding are extremely poor. To improve the hydrolysis stability without degrading the flowability during molding, it is disclosed in Japanese Patent Disclosure (Kokai) No. 87452/82 that a monovalent glycidyl ester compound is added to the aromatic polyesters. However, by this method, the improvement in the hydrolysis stability is small and the heat-aging resistance is poor, so that the method is not satisfactory.

As to the improvement in the resistance to thermal cycling, Japanese Patent Disclosure (Kokai) No. 285947/87 discloses a method in which an epoxy group-containing copolymer and a rubbery graft-polymers are added. However, this method has a drawback in that the flowability of the resin during molding is lowered and the hydrolysis stability is low.

SUMMARY OF THE INVENTION

Accordingly, the object of the present invention is to provide an aromatic polyester composition and preparation process thereof, which composition has excellent mechanical properties such as impact strength and excels in flowability and residence stability during molding, which also has excellent hydrolysis stability, heat-aging resistance, resistance to thermal cycling and weatherability, and thus which is useful as electric or electronic parts and as automobile parts.

The object of the present invention has been accomplished by providing a polyester composition comprising:

(a) 100 parts by weight of an aromatic polyester;

(b) 0.005–10 parts by weight of an epoxy compound of the formula (I):

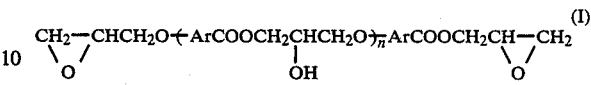

(wherein Ar means $C_6$–$C_{20}$ aromatic group or $C_6$–$C_{20}$ alicyclic group, n means an integer of 0–20); and (c) 1–70 parts by weight of at least one elastomer which has at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, the elastomer having a tensile modulus of 1–6,000 $kg/cm^2$.

Further, the object of the present invention has been accomplished more advantageously, in terms of the improvement in the weatherabilty, by incorporating a hindered phenol derivative compound and/or a sulfur-containing ester compound in the aromatic polyester composition.

DETAILED DESCRIPTION OF THE PREFERRED EMBODIMENTS

The aromatic polyester employed in the present invention is a polyester having an aromatic ring in the repeating unit thereof, and is a polymer or a copolymer obtained by the polycondensation reaction chiefly between an aromatic dicarboxylic acid (or an ester-forming derivative thereof) and a diol (or an ester-forming derivative thereof).

Examples of the aromatic dicarboxylic acid herein used include terephthalic acid, isophthalic acid, orthophthalic acid, 1,5-naphthalene dicarboxylic acid, 2,5-naphthalene dicarboxylic acid, 2,6-naphthalene dicarboxylic acid, 2,7-naphthalene dicarboxylic acid, 2,2'-biphenyldicarboxylic acid, 3,3'-biphenyldicarboxylic acid, 4,4'-biphenyldicarboxylic acid, 4,4'-diphenylether dicarboxylic acid, 4,4'-diphenylmethane dicarboxylic acid, 4,4'-diphenylsulfone dicarboxylic acid, 4,4'-diphenylisopropylidene dicarboxylic acid, 1,2-bis(-phenoxy)ethane-4,4'-dicarboxylic acid, 2,5-anthracene dicarboxylic acid, 2,6-anthracene dicarboxylic acid, 4,4''-p-terphenylene dicarboxylic acid and 2,5-pyridine dicarboxylic acid. Terephthalic acid may preferably be used.

Two or more aromatic dicarboxylic acids may be used in combination. One or more aliphatic dicarboxylic acids such as adipic acid, azelaic acid, dodecanedionic acid, sebacic acid and dimer acid; and/or one or more alicyclic dicarboxylic acids such as cyclohexane dicarboxylic acid may be used in combination with the aromatic dicarboxylic acid as long as their amount is small.

Examples of the diol component include aliphatic diols such as ethylene glycol, propylene glycol, butylene glycol, 1,5-pentane diol, hexylene glycol, neopentyl glycol, 2-methyl-1,3-propane diol, diethylene glycol and triethylene glycol; alicyclic diols such as 1,4-cyclohexane dimethanol; as well as mixtures thereof. Small amount of one or more long-chain diols with a molecular weight of 400–6,000, such as polyethylene glycol, polypropylene glyco and polytetramethylene glycol may be copolymerized.

Specific examples of the aromatic polyester include polyethylene terephthalate, polypropylene terephthalate, polybutylene terephthalate, polycyclohexanedimethylene terephthalate, polyethylene naphthalate, polybutylene naphthalate, polyethylene-1,2-bis(phenoxy)ethane-4,4'-dicaboxylate; as well as polyester copolymers such as polyethylene isophthalate/terephthalate, polybutylene telephthalate/isophthalate, polybutylene terephthalate/decane dicarboxylate and polyethylene terephthalate/4,4'-biphenyl dicarboxylate. Among these, polybutylene terephthalate and polyethylene terephthalate which have well balanced mechanical properties and flowability may preferably be used.

The aromatic polyester which is used in the present invention preferably has a relative viscosity of 1.15–2.0, more preferably 1.3–1.85, at 25° C. when measured as a 0.5% solution in o-chlorophenol. If the relative viscosity of the aromatic polyester is less than 1.15, sufficient mechanical strength cannot be obtained. If the relative viscosity is more than 2.0, a molded article with good surface gloss cannot be obtained.

The epoxy compound employed in the present invention is represented by the above-described formula (I).

Preferred examples of the group Ar include 1,4-phenylene, 1,3-phenylene, 1,2-phenylene, 2-methyl-1,4-phenylene, 4,4'-biphenylene, 3,3'-biphenylene, 2,2'-biphenylene, 3,4'-biphenylene, 1,4-naphthylene, 1,5-naphthylene, 2,6-naphthylene, 2,7-naphthylene, 1,4-cyclohexylene, 1,3-cyclohexylene, 1,2-cyclohexylene, 4,4'-bicyclohexylene and 2,6-decahydronaphthylene. Among these, 1,4-phenylene, 1,3-phenylene and 2,6-naphthylene are especially preferred.

The degree of polymerization "n" in the formula (I) is an integer of 0 or 1–20, preferably 0 or 1–10. The epoxy compound may be a mixture of compounds with various degree of polymerization.

The preparation process of the epoxy compound represented by the formula (I) is not restricted. For example, it may be obtained by reacting a hydroxycarboxylic acid with an epihalohydrin under the presence of a catalyst such as a quaternary ammonium salt, tertiary amine and tertiary phosphine at 40° C. to 150° C. to halohydrin ester-etherify the hydroxycarboxylic acid and then adding an alkaline metal salt to eliminate hydrogen halide from the reaction product. Epoxy compounds with high degree of polymerization may be obtained by reacting the hydroxycarboxylic acid at varying ratio under the presence of a catalyst.

The content of the epoxy compound in the composition of the present invention is 0.005 to 10 parts by weight, preferably 0.05–5 parts by weight, and more preferably 0.2–3 parts by weight with respect to 100 parts by weight of the polyester. If the content of the epoxy compound is less than 0.005 parts by weight, the improvement in the hydrolysis stability is not sufficient, and if the content of the epoxy compound is more than 10 parts by weight, the mechanical properties of the aromatic polyester resin are degraded.

The elastomer employed in the present invention, which has at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, which has a tensile modulus of 1–6,000 kg/cm² may be any elastomer which has, in any form in its molecular chain, at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, and which has a tensile modulus of 1–6,000 kg/cm². It should be noted, however, those elastomers having a glass transition temperature of not higher than 0° C. are preferred. Further, those elastomers having a tensile modulus of 5–2,000 kg/cm² are preferred.

The elastomer employed in the present invention preferably has an MI (melt index) of 0.1–100, more preferably 0.5–30. If the MI is outside the above range, the improvement in the resistance to thermal cycling of the polyester composition is small, so that it is not preferred. The MI herein means that determined in accordance with ASTM D-1238 (measured at 190° C.) and is expressed in terms of g/10 minutes.

The content of the elastomer is 1–70 parts by weight, preferably 2–50 parts by weight with respect to 100 parts by weight of the aromatic polyester. If the content of the elastomer is less than 1 part by weight, the improvement in the impact strength of the aromatic polyester composition is not sufficient. If the content of the elastomer is more than 70 parts by weight, the flowability of the resin composition is lowered.

Preferred examples of the elastomer employed in the present invention include the following (i)–(iv).

(i) glycidyl group-containing copolymers of an α-olefin and a glycidyl ester of an α,β-unsaturated acid;

(ii) modified ethylene-based copolymers obtained by graft-copolymerizing an ethylene-based polymer with 0.01 to 10% by weight of an unsaturated carboxylic acid or a derivative thereof;

(iii) ethylene-based random copolymers of ethylene and an unsaturated carboxylic acid or a derivative thereof;

(iv) acrylic polymers which may or may not contain a diene-based polymer; and (v) conjugated diene-based polymers having at least one functional group selected from the group consisting of hydroxyl group, carboxylic group, acid anhydride group, amino group and cyano group.

Examples of the α-olefin in the glycidyl group-containing copolymers (i) of an α-olefin and a glycidyl ester of an α,β-unsaturated acid include ethylene, propylene, butene-1 and octene-1, and ethylene may preferably be used. The glycidyl ester of an α,β-unsaturated acid means a compound represented by the general formula:

(wherein R means hydrogen, lower alkyl group or lower alkyl group substituted with a glycidyl ester group). Examples of the compound include glycidyl acrylate, glycidyl methacrylate, glycidyl ethacrylate and glycidyl itaconate. Among these, glycidyl methacrylate and glycidyl acrylate may preferably be used.

The glycidyl group-containing copolymer may be copolymerized with one or more other copolymerizable monomers such as, for example, vinyl ethers, vinyl esters such as vinyl acetate, vinyl cyanates, aromatic vinyls, carbon monoxide and unsaturated monomer esters, in particular, $C_1$–$C_{10}$ alkyl acrylate and $C_1$–$C_{10}$ alkyl methacrylate.

The content of the copolymerized glycidyl ester of the $\alpha,\beta$-unsaturated acid in the glycidyl group-containing copolymer is 0.1–50% by weight, preferably 1–25% by weight of the glycidyl group-containing copolymer. If the content of the copolymerized glycidyl ester is less than 0.1% by weight, the improvement in the mechanical properties of the polyester composition is small, and if the content is more than 50% by weight, the flowability during molding is decreased.

Preferred examples of the glycidyl group-containing copolymers include ethylene/glycidyl methacrylate copolymers, ethylene/vinyl acetate/glycidyl methacrylate copolymers, ethylene/glycidyl acrylate copolymers, ethylene/ethyl acrylate/glycidyl methacrylate copolymers, ethylene/vinyl acetate/glycidyl acrylate copolymers and ethylene/glycidyl acrylate/butyl acrylate copolymers. Ethylene/glycidyl methacrylate copolymers are most preferred.

The modified ethylene-based copolymers (ii) obtained by graft copolymerizing an ethylene-based polymer with a 0.01 to 10% by weight of an unsaturated carboxylic acid or a derivative thereof are those obtained by graft-copolymerizing an unmodified ethylene-based copolymer with 0.01–10% by weight of an unsaturated carboxylic acid or a derivative thereof.

Preferred examples of the unmodified ethylene-based copolymer employed as the stem polymer include the following (A) to (E):

(A) Copolymers of ethylene and an $\alpha$-olefin such as propylene and/or butene-1. Examples thereof include ethylene/propylene copolymers, ethylene/butene-1 copolymers and ethylene/pentene-1 copolymers.

(B) Copolymers of ethylene, propylene and/or butene-1 and a $C_6$–$C_{20}$ non-conjugated diene. Examples of the non-conjugated diene include 1,4-hexadiene, dicyclopentadiene and ethylidene norbornane. Examples of the copolymer include ethylene/propylene/ethylidene norbornane copolymers, ethylene/propylene/dicyclopentadiene copolymers and ethylene/butene-1/ethylidene norbornane copolymers.

(C) Copolymers of ethylene and $C_1$–$C_{10}$ alkyl acrylate or $C_1$–$C_{10}$ alkyl methacrylate. Examples of these copolymers include ethylene/ethyl acrylate copolymers, ethylene/methyl acrylate copolymers, ethylene/methyl methacrylate copolymers, ethylene/butyl acrylate copolymers and the like.

(D) Copolymers of ethylene and saponified or non-saponified vinyl acetate. Examples of these copolymers include ethylene/vinyl acetate copolymers, partially saponified ethylene/vinyl acetate copolymers, saponified ethylene/vinyl acetate copolymers (ethylene/vinyl alcohol copolymers) and the like.

(E) Hydrogenated styrene-butadiene block copolymers or hydrogenated styrene-isoprene block copolymers. Examples of these copolymers include hydrogenated styrene-isoprene-styrene ternary block copolymers, hydrogenated styrene-butadiene block copolymers, and the like.

The unsaturated carboxylic acid which is graft-copolymerized with the ethylene-based copolymer may preferably be a $C_3$–$C_{40}$ unsaturated carboxylic acid. Examples thereof include acrylic acid, methacrylic acid, crotonic acid, maleic acid, fumaric acid, itaconic acid, 5-norbornane-2,3-dicarboxylic acid, tetrahydrophthalic acid, dimer acid, methylendomethylene tetrahydrophthalic acid, and the like. Examples of the derivatives of the unsaturated carboxylic acid include anhydrides, esters (especially glycidyl esters), amides, imides and metal salts of the above-mentioned unsaturated carboxylic acids.

In particular, preferred examples of the unsaturated carboxylic acid or the derivative thereof include acrylic acid, methacrylic acid, maleic anhydride, itaconic anhydride, tetrahydrophthalic anhydride, glycidylacrylate, glycidylmethacrylate, diglycidyl maleate, diglycidyl tetrahydrophthalate, diglycidyl dimerate, acrylamide, methacrylamide, maleic imide, N-phenylmaleic imide, sodium methacrylate, and the like.

The method of graft-copolymerizing the ethylene-based copolymer with the unsaturated carboxylic acid or the derivative thereof is not restricted. The graft-copolymerization may be accomplished, for example, by dissolving the ethylene-based copolymer in a solvent such as benzene and toluene under heat and adding thereto the unsaturated carboxylic acid and/or the derivative thereof and a radical initiator; or by melt-compounding the ethylene-based copolymer, the unsaturated carboxylic acid and/or the derivative thereof and the radical initiator using an extruder or a neader. When the unsaturated carboxylic acid and/or the unsaturated carboxylic acid anhydride is graft-copolymerized, the resulting copolymer may be treated with an appropriate amount of a metal compound to form a metal salt of the carboxylic acid.

The content of the unsaturated carboxylic acid or the derivative thereof to be graft-copolymerized is 0.01–10% by weight, preferably 0.1–3% by weight with respect to the modified ethylene copolymer. If the grafting is less than 0.01% by weight, the improvement in the impact strength of the aromatic polyester is not sufficient, and if the content is more than 10% by weight, the flowability of the resin composition during molding is degraded.

Preferred examples of the unsaturated carboxylic acid constituting the ethylene-based random copolymers (iii) of ethylene and an unsaturated carboxylic acid or a derivative thereof include $C_3$–$C_{20}$ unsaturated carboxylic acid. Specific examples thereof include acrylic acid, methacrylic acid, crotonic acid, maleic acid, fumaric acid, itaconic acid, 5-norbornane-2,3-dicarboxylic acid, tetrahydrophthalic acid dimer acid and methylendomethylenetetrahydrophthalic acid. Among these, acrylic acid and methacrylic acid are especially preferred. Preferred examples of the derivative of the unsaturated carboxylic acid include metal salts such as lithium, sodium, potassium, magnesium, barium, zinc, aluminum and calcium salt; and $C_1$–$C_8$ alkyl esters of the unsaturated carboxylic acid. Preferred examples of the ethylene-based random copolymer include ethylene/methyl acrylate copolymers, ethylene/ethyl acrylate copolymers, ethylene/butyl acrylate copolymers, ethylene/methyl methacrylate copolymers, ethylene/ethyl methacrylate copolymers, ethylene/acrylic acid copolymers and 0–100% neutralized sodium or zinc salt thereof, ethylene/methacrylic acid copolymers and 0–100% neutralized sodium or zinc salt thereof, and ethylene/butyl acrylate/methacrylic acid copolymers and 0–100% neutralized sodium or zinc salt thereof.

The acrylic polymer which may or may not contain a diene-based polymer (iv) is one obtained by graft-copolymerizing one or more unsaturated monomers selected from the group consisting of aromatic monovinyl compounds, vinyl cyanate derivatives, (meth)acrylic acid and (meth)acrylate compounds, with a graft base of polyacrylate which may contain the diene-based polymer.

Examples of the polyacrylic graft base include acrylate polymers and copolymers which may contain a diene-based rubber nucleus such as polybutadiene, which preferably contain not less than 40% by weight, more preferably not less than 60% by weight of acrylate. As the acrylate, esters of acrylic acid with $C_1$–$C_8$ monovalent alcohol such as methyl, ethyl, propyl, hexyl, 2-ethylhexyl and octyl alcohol are preferred.

The graft base may be copolymerized with a crosslinkable monomer. Examples of the crosslinkable monomer include esters of $C_3$–$C_8$ unsaturated carboxylic acid with $C_3$–$C_{12}$ unsaturated monovalent alcohol (e.g., allyl methacrylate); heterocyclic compounds containing a plurality of unsaturated groups (e.g., triallyl cyanurate, triallyl cyanurate and tris-acryloyl-S-triazine); polyfunctional vinyl compounds (e.g., di- and tri-vinyl benzene), triallyl phosphate and diallyl phthalate. Among these, allyl methacrylate, ethylene dimethacrylate, diallyl phthalate, triallyl isocyanurate, triallyl cyanurate, triacryloyl hexahydro-S-triazine and triallyl benzene are preferred. The content of the crosslinkable monomer is preferably 0.02–5% by weight with respect to the graft base.

The vinyl monomer which is grafted to the polyacrylic graft base is at least one member selected from the group consisting of aromatic vinyl compounds, cyanated vinyl compounds and (meth)acrylate compounds. Preferred are α-methyl styrene, styrene, acrylonitrile, methyl methacrylate, glycidyl methacrylate and glycidyl acrylate, as well as mixtures thereof. The above-mentioned crosslinkable monomers may be copolymerized in combination with the graft component. The acrylic polymer may be of any structure, and may preferably be a multi-step polymer of so called coreshell type.

As the above-mentioned rubbery copolymer, those commercially available such as sold under the trade names of "Acryloid" (commercially available from Rohm and Haas Co.), "Kane-Ace" (commercially available from Kanegafuchi Chemical Industry Co., Ltd.), "Blendix" (commercially available from Vorg-Warner Co., Ltd.), and "BTA" and "HIA" (commercially available from Kureha Chemical Industry Co., Ltd.) may also be used.

The conjugated diene-based polymers (v) having at least one functional group selected from the group consisting of hydroxyl group, carboxylic group, acid anhydride group, amino group and cyano group are those obtained by graft-copolymerizing or random-copolymerizing an unsaturated monomer having the above-mentioned functional group with the conjugated dienebased polymer.

The conjugated diene-based polymer used as the base of the graft-copolymerization may be a polymer obtained by polymerizing a conjugated diene-based monomer such as butadiene, isoprene and cyclopentadiene, as well as a copolymer obtained by copolymerizing the conjugated diene-based monomer with a copolymerizable monomer such as aromatic vinyls such as styrene, cyanated vinyls such as acrylonitrile, and acrylates such as ethylacrylate or methylmethacrylate.

Examples of the conjugated diene-based polymer include polybutadiene, butadiene/styrene copolymers, butadiene/acrilonitrile copolymers, styrene/butadiene block copolymers and styrene/isoprene block copolymers. The monomer to be graft-copolymerized with the conjugated diene-based polymer may be any monomer as long as it has hydroxyl group, carboxyl group, acid anhydride group, amino group or cyano group. Preferred examples of the monomer include methacrylic acid, acrylic acid, maleic anhydride, acrylamide, methacrylamide and acrylonitrile.

Preferred examples of the copolymer include butadiene/acrylonitrile copolymers, butadiene/styrene/acrylonitrile copolymers, butadiene/acrylonitrile/acrylic acid copolymers, butadiene/styrene-g-methylmethacrylate/styrene copolymers, styrene/butadiene-g-maleic anhydride copolymers and styrene/isoprene-g-maleic anhydride copolymers.

Among the above-described elastomers (i)–(v), more preferred are (i), (ii), (iii) and (iv), especially (i) and (ii). These elastomers may be used individually or in combination.

Although not essential, the weatherability of the polyester composition may further be promoted by blending a hindered phenol derivative and/or a sulfurcontaining ester compound.

Preferred examples of the hindered phenol compound which may be used in the present invention are those having a structural unit represented by the following formula (II):

(wherein $R_1$ represents a $C_1$–$C_{10}$ alkyl group such as methyl, ethyl, propyl and t-butyl group).

Those having a molecular weight of not less than 500 are preferred. Specific examples of the hindered phenol compound include triethylene glycol-bis-3-(3'-t-butyl-4'-hydroxy-5-methylphenyl) propionate,
1,3,5-tris(3',5'-di-t-butyl-4'-hydroxybenzoyl) isocyanurate,
1,3,5-trimethyl-2,4,6-tris(3',5'-di-t-butyl-4'hydroxybenzyl) benzene, hexamethylene glycol-bis-
[β-(3,5-di-t-butyl-4-hydroxy-phenyl) propionate], 6-(4'-hydroxy-3',5'-di-t-butylanilino)-2,4-bis-octyl-thio-1,3,5-triazine,
tetrakis[methylene-3(3',5'-di-t-butyl-4'-hydroxy-phenyl) propionate] methane,
2,2'-thio[diethyl-bis-3(3'',5''-di-t-butyl-4'' hydroxyphenyl) propionate],
n-octadecyl-3-(4'-hydroxy-3',5'-di-t-butylphenol) propionate,
N,N'-hexamethylene-bis-3-(3',5'-di-t-butyl-hydroxypropamide), 1,3,5-tris(3',5'-di-t-butyl-4'-hydroxybenzyl) isocyanurate, 3,5-di-t-butyl-4-hydroxy-benzyl phosphoric acid dimethyl ester and
bis(3,5-di-t-butyl-4-hydroxy-benzyl · phosphoric acid) monomethyl ester nickel salt. Among these,
n-octadecyl-3-(4'-hydroxy-3',5'-di-t-butylphenol) propionate,
tetrakis[methylene-3(3',5'-di-t-butyl-4'-hydroxy-phenyl) propionate] methane and triethylene glycol-bis-3-(3'-t-butyl-4'-hydroxy-5-methylphenyl) propionate are preferred.

The sulfur-containing ester compounds which may be used in the present invention are esters containing at least one sulfur atom in the molecule. Preferred examples of the ester compounds may be represented by the following formulae (III) and (IV).

$$S-R_2COOR_3)_2 \qquad (III)$$

$$(R_5SR_4COOCH_2)_4C \qquad (IV)$$

(wherein $R_2$ and $R_4$ independently represent $C_1$-$C_{10}$ alkylene group, $R_3$ and $R_5$ independently represent $C_3$-$C_{40}$ alkyl group)

Preferred examples of $R_2$ and $R_4$ include methylene, ethylene, propylene, butylene and hexylene group. Preferred examples of $R_2$ and $R_5$ include octyl, decyl, lauryl, dodecyl, myristyl and stearyl group.

Specific examples of the sulfur-containing compounds include dioctylthiodipropionate, didodecylthiodipropionate, dodecylstearylthiodipropionate, distearylthiodipropionate, dimyristylthiodipropionate, ditridecylthiodipropionate, didodecyl $\beta,\beta'$-thiodibutylate, distearyl-$\beta$, $\beta'$-thiodibutylate, pentaerythritol-tetrakis(dodecylthiopropionate), pentaerythritol-tetrakis(dodecylthioacetate), pentaerythritol-tetrakis(dodecylthiobutylate) and pentaerythritol-tetrakis(octadecylthiopropionate). Among these, didodecylthiodipropionate, distearylthiodipropionate, distearyl-$\beta$, $\beta'$-thiodibutylate and pentaerythritol-tetrakis(dodecylthiopropionate) are preferred.

The total content of the hindered phenol derivative and/or the sulfur-containing ester compound may be 0.01–5 parts by weight, preferably 0.05–3 parts by weight, more preferably 0.05–0.5 parts by weight with respect to 100 parts by weight of the polyester. By incorporating the hindered phenol derivative and/or sulfur-containing ester compound in the polyester composition in the amount as mentioned above, the properties of the composition of the present invention may be promoted, and the weatherability is also improved.

Although not essential, the rigidity of the composition of the present invention may greatly be promoted without degrading other properties by incorporating in the composition a fibrous and/or granular filler.

By incorporating a filler, the resistance to thermal cycling is further promoted due to the synergistic effect of the epoxy compound and the elastomer.

Examples of the filler include glass fibers, carbon fibers, metal fibers (e.g., stainless steel fibers), aramide fibers, asbestos, potassium thitanate whiskers, wallastenite, glass flakes, glass beads, talc, mica, clay, sepiolite, calcium carbonate, barium sulfate, titanium oxide, aluminum oxide and gypsum fibers. Among these, glass fibers of the chopped strand type are especially preferred. The content of the filler is usually not more than 50 parts by weight with respect to 100 parts by weight of the aromatic polyester composition.

The aromatic polyester composition of the present invention may further contain one or more of the conventional additives such as antioxidants, heat stabilizers, ultraviolet absorbers, lubricants, mold releasing agents, dyes, colorants including pigments and nucleating agents.

Although the preparation process of the composition of the present invention is not restricted, the composition may preferably be prepared by melt-compounding the three components, i.e., aromatic polyester, the elastomer and the epoxy compound at a temperature higher than the melting point of the aromatic polyester using an extruder, or by adding the two components at the end of the polymerization of the aromatic polyester.

In cases where the fibrous and/or granular filler is incorporated, an aromatic polyester composition with extremely great resistance to thermal cycling may be obtained by first melt-mixing the aromatic polyester, the epoxy compound represented by the formula (I) and the fibrous and/or granular filler, and then melt-mixing the elastomer therewith.

Although the preparation process in this case is not restricted, a process in which the three components, i.e., the aromatic polyester compound, the epoxy compound and the fibrous and/or granular filler are first melt-mixed using an extruder to pelletize the resulting mixture, and then the pellets and the elastomer are melted and mixed using an extruder; or a process in which the three components are fed into an extruder from the hopper which is farthermost from the extrusion die and the elastomer is fed from the hopper nearest from the extrusion die, may preferably be employed.

The resin composition of the present invention may easily be molded by the conventional methods such as injection molding and extrusion molding, and the resulting molded article has excellent properties.

The effects of the present invention will further be described by way of examples and comparative examples thereof. These examples are presented for the illustration purpose only and the scope of the invention is not limited thereto.

Examples 1–20, Comparative Examples 1–13

One hundred parts by weight of a polybutylene terephthalate with a relative viscosity of 1.65, the elastomer (A-1) to (A-19) listed in Table 1, the epoxy compound (B-1) to (B-6) listed in Table 2, are dry-blended using a V-blender in the mixing ratio shown in Table 3, and the resulting blend was melt-compounded, and pelletized using a 30 mm $\phi$ twin screw extruder. The obtained pellets were fed in a 5-ounce injection molder of screw-in-line type. Setting the cylinder temperature to 250° C., mold temperature to 90° C., and the molding cycle (injection time/cooling time/interval time) to 15 seconds/20 seconds/10 seconds (hereinafter referred to as molding cycle [A]), ASTM-1 dumbbell and Izod impact test pieces with ¼ inch width were obtained and the minimum injection pressure (gauge pressure) which is the minimum pressure required to feed the resin in the mold cavity was determined. The smaller this value, the greater the flowability of the composition during molding. If this value sharply decreases after long period of residence, it means that the residence stability is poor.

To determine the influence by the residence time on molding, test samples were obtained in the same manner as described above except that the molding cycle (injection time/cooling time/interval time) was 15 seconds/20 seconds/900 seconds (hereinafter referred to as molding cycle [B]).

The obtained test samples were treated with boiled water with a temperature of 100° C. for 15 days.

The resulting test samples were subjected to tensile test in accordance with ASTM D-638, and to Izod impact test in accordance with ASTM D-256.

TABLE 1

| Elastomer No. | MI (g/10 min) | Tg (°C.) | Tensile Modulus (kg/cm²) | Elastomer Composition |
|---|---|---|---|---|
| A-1 | 3.0 | −22 | 900 | E/GMA (90/10 (wt/wt)) |
| A-2 | 2.5 | −24 | 750 | E/VAC/GMA (80/10/10 (wt/wt)) |
| A-3 | 3.2 | −45 | 150 | E/P-g-MAH (74/26) (mol/mol) -g-1.5 (wt ratio) |
| A-4 | 3.4 | −35 | 100 | E/B-g-GMA (76/14 (mol/mol) -g-3.2 (wt ratio) |
| A-5 | 16 | −18 | 250 | E/EA-g-MAH (72/28-g-1.5 (wt ratio)) |
| A-6 | 1.2 | −39 | 75 | SEBS-g-MAH (styrene content 13%, -g-1.5 wt %) |
| A-7 | 6.4 | −32 | 300 | E/P-g-AAM (82/18-g-2.0 (wt ratio)) |
| A-8 | 16 | −30 | 400 | E/EA (68/32 (wt/wt)) |
| A-9 | 7 | −8 | 850 | E/AA (82/18 (wt/wt)) |
| A-10 | 0.7 | −19 | 1200 | 80% zinc-neutralized E/MA/IBA (75/15/10 (wt ratio) |
| A-11 | 16 | −37 | 650 | BA/EDM//MMA/ST (69.5/0.5//16/14 (wt ratio) |
| A-12 | 17 | −55 | 340 | BD/ST/MMA/DVB//ST//MMA/BDM (71/3/4/1//11//11//0.1, (wt ratio)) |
| A-13 | 27 | −18 | 970 | BD/MMA (70/30 (wt/wt)) |
| A-14 | 45 | −6 | 1050 | BD/AN/AA (72/26/2 wt ratio)) |
| A-15 | 3.2 | −49 | 100 | E/P (74/26 (mol/mol)) |
| A-16 | 7.5 | −45 | 50 | SEBS (styrene content 13%) |
| A-17 | 16 | −19 | 430 | ST/BD (30/70 (wt/wt)) |
| A-18 | 6 | −1 | 7400 | E/P-g-GMA (10/90 - 2 (wt ratio) |
| A-19 | 25 | +16 | 760 | BMA/GMA (98/2 (wt/wt)) |

Abbreviation:
E: ethylene, GMA: glycidyl methacrylate, VAC: vinyl acetate, P: propylene, MAH: maleic anhydride, EA: ethyl acrylate, SEBS: hydrogenated styrene-butadiene-styrene triblock copolymer, AAM: acrylamide, AA: acrylic acid, MA: methacrylic acid, IBA: isobutylacrylate, BA: n-butyl acrylate, EDM: ethylene dimethacrylate, MMA: methyl methacrylate, BMA: n-butyl methacrylate, ST: styrene, BD: butadiene, DVB: divinyl benzene, BDM: butylene dimethacrylate, AN: acrylonitrile, /: copolymer, -g-: graft, //: surface graft, Tg: glass transition temperature

TABLE 2

| Epoxy Compound No. | Structure |
|---|---|
| B-1 | $CH_2\text{-}CHCH_2O\text{-}\langle\text{phenyl}\rangle\text{-}COOCH_2CH\text{-}CH_2$ (with epoxide groups) |
| B-2 | $CH_2\text{-}CHCH_2O\text{-}[\langle\text{phenyl}\rangle\text{-}COOCH_2CHCH_2O\text{-}]_{2.2}\langle\text{phenyl}\rangle\text{-}COOCH_2CH\text{-}CH_2$ with OH |
| B-3 | $CH_2\text{-}CHCH_2O\text{-}[\langle\text{naphthyl}\rangle\text{-}COOCH_2CHCH_2O\text{-}]_{2.2}\langle\text{naphthyl}\rangle\text{-}COOCH_2CH\text{-}CH_2$ with OH |
| B-4 | $CH_2\text{-}CHCH_2O\text{-}\langle\text{phenyl}\rangle\text{-}C(CH_3)_2\text{-}\langle\text{phenyl}\rangle\text{-}OCH_2CH\text{-}CH_2$ |
| B-5 | $CH_2CHCH_2OCO\text{-}\langle\text{phenyl}\rangle\text{-}COOCH_2CH\text{-}CH_2$ |
| B-6 | $t\text{-}Bu\text{-}\langle\text{phenyl}\rangle\text{-}COOCH_2CHCH_2$ |

TABLE 3

| | | Molding Cycle [A] | | |
|---|---|---|---|---|
| | | | Non-Treated Article | Boiled Water-Treated Article |
| Elastomer | Epoxy Compound | Minimum | Impact | Impact |

TABLE 3-continued

| | | | | | Molding Cycle [A] | | | | | Molding Cycle [B] | | | | |
|---|---|---|---|---|---|---|---|---|---|---|---|---|---|---|
| | | | | | | Non-Treated Article | | Boiled Water-Treated Article | | Non-Treated Article | | Boiled Water-Treated Article | | |
| | No. | Amount (parts by wt) | No. | Amount (parts by wt) | Injection Pressure (kg/cm²) | Tensile Strength (kg/cm²) | Impact Strength (kg·cm/cm) | Tensile Strength (kg/cm²) | Impact Strength (kg·cm/cm) | Minimum Injection Pressure (kg/cm²) | Tensile Strength (kg/cm²) | Impact Strength (kg·cm/cm) | Tensile Strength (kg/cm²) | Impact Strength (kg·cm/cm) |
| Example No. | | | | | | | | | | | | | | |
| 1 | A-1 | 20 | B-1 | 0.5 | 49 | 395 | 59 | 365 | 48 | 51 | 390 | 53 | 340 | 29 |
| 2 | A-1 | 20 | B-1 | 1.0 | 47 | 400 | 60 | 380 | 52 | 48 | 405 | 57 | 355 | 34 |
| 3 | A-1 | 20 | B-1 | 2.0 | 43 | 405 | 62 | 395 | 53 | 43 | 400 | 58 | 375 | 36 |
| 4 | A-1 | 20 | B-2 | 1.0 | 46 | 395 | 57 | 385 | 51 | 47 | 405 | 45 | 365 | 42 |
| 5 | A-1 | 20 | B-3 | 1.0 | 47 | 410 | 62 | 395 | 53 | 49 | 405 | 47 | 375 | 41 |
| 6 | A-2 | 20 | B-1 | 1.0 | 50 | 425 | 65 | 405 | 51 | 48 | 390 | 42 | 350 | 30 |
| 7 | A-3 | 20 | B-1 | 1.0 | 50 | 420 | 62 | 385 | 51 | 48 | 405 | 49 | 370 | 41 |
| 8 | A-4 | 20 | B-1 | 1.0 | 47 | 395 | 62 | 385 | 55 | 49 | 400 | 56 | 350 | 32 |
| 9 | A-5 | 5 | B-1 | 1.0 | 39 | 440 | 19 | 425 | 15 | 40 | 435 | 14 | 420 | 12 |
| 10 | A-5 | 20 | B-1 | 1.0 | 47 | 400 | 72 | 390 | 60 | 45 | 380 | 61 | 365 | 50 |
| 11 | A-5 | 35 | B-1 | 1.0 | 54 | 360 | >90 | 355 | 78 | 51 | 370 | >90 | 340 | 62 |
| 12 | A-6 | 20 | B-1 | 1.0 | 54 | 420 | 80 | 395 | 62 | 51 | 395 | 51 | 380 | 39 |
| 13 | A-7 | 20 | B-1 | 1.0 | 47 | 385 | 59 | 375 | 55 | 46 | 370 | 53 | 360 | 42 |
| 14 | A-8 | 20 | B-1 | 1.0 | 42 | 410 | 48 | 405 | 39 | 42 | 395 | 42 | 360 | 36 |
| 15 | A-9 | 20 | B-1 | 1.0 | 53 | 420 | 57 | 380 | 41 | 42 | 375 | 39 | 330 | 29 |
| 16 | A-10 | 20 | B-1 | 1.0 | 54 | 405 | 53 | 395 | 39 | 59 | 420 | 52 | 370 | 42 |
| 17 | A-11 | 20 | B-1 | 1.0 | 40 | 385 | 39 | 375 | 28 | 38 | 370 | 29 | 355 | 18 |
| 18 | A-12 | 20 | B-1 | 1.0 | 42 | 375 | 42 | 370 | 31 | 37 | 360 | 27 | 350 | 16 |
| 19 | A-13 | 20 | B-1 | 1.0 | 43 | 375 | 45 | 355 | 29 | 38 | 345 | 27 | 340 | 21 |
| 20 | A-14 | 20 | B-1 | 1.0 | 45 | 380 | 39 | 350 | 32 | 37 | 335 | 27 | 320 | 23 |
| Comp. Ex. | | | | | | | | | | | | | | |
| 1 | A-15 | 5 | B-1 | 1.0 | 59 | 250 | 6.0 | 170 | 5.5 | 55 | 165 | 5.0 | 145 | 4.0 |
| 2 | A-16 | 20 | B-1 | 1.0 | 57 | 235 | 5.0 | 185 | 5.0 | 56 | 160 | 4.5 | 155 | 4.5 |
| 3 | A-17 | 20 | B-1 | 1.0 | 56 | 320 | 12.5 | 295 | 11.5 | 37 | 175 | 6.0 | 170 | 4.0 |
| 4 | A-18 | 20 | B-1 | 1.0 | 62 | 420 | 13.5 | 285 | 4.5 | 59 | 355 | 9.5 | 225 | 4.0 |
| 5 | A-19 | 20 | B-1 | 1.0 | 52 | 430 | 6.5 | 395 | 6.5 | 42 | 370 | 5.5 | 350 | 5.0 |
| 6 | A-5 | 20 | B-4 | 1.0 | 48 | 350 | 45 | 270 | 10.5 | 49 | 335 | 35 | 225 | 8.5 |
| 7 | A-5 | 20 | B-5 | 1.0 | 120 | 380 | 35 | 275 | 13.5 | 145 | 395 | 32 | 275 | 7.5 |
| 8 | A-5 | 20 | B-6 | 1.0 | 52 | 350 | 40 | 260 | 9.0 | 42 | 280 | 17 | 190 | 13.5 |
| 9 | A-5 | 20 | B-4 / B-5 | 0.5 / 0.5 | 80 | 395 | 42 | 265 | 17.5 | | | | | |
| 10 | A-5 | 20 | B-1 | 0.001 | 51 | 350 | 44 | 265 | 12.0 | | | | | |
| 11 | A-5 | 20 | B-1 | 15 | 26 | 120 | 4.0 | 75 | 4.0 | | | | | |
| 12 | A-5 | 0.1 | B-1 | 1.0 | 37 | 550 | 4.5 | 250 | 4.0 | | | | | |
| 13 | A-5 | 100 | B-1 | 1.0 | 85 | 165 | >90 | 155 | 35 | | | | | |

TABLE 3-continued

| 9  | 92 | 380 | 12.5 | 225 | 5.5 |
| 10 | 47 | 330 | 7.5  | 195 | 4.5 |
| 11 | 85 | 720 | 2.0  | 240 | 1.5 |
| 12 | 37 | 545 | 4.0  | 230 | 3.0 |
| 13 | 95 | 105 | >90  | 85  | 13.5 |

EXAMPLES 21-27, COMPARATIVE EXAMPLES 14-17

Using 100 parts by weight of a polybutylene terephthalate with a relative viscosity of 1.45, 20 parts by weight of glass fibers (3 mm length, chopped strand type), elastomer (A-1) or (A-5) and epoxy compound (B-1) or (B-4), in the amount shown in Table 4, melt-mixing and molding were conducted as in Example 1.

The ASTM-1 dumbbells obtained through molding cycle [A] were subjected to a heat cycling test in which thermal shock of 150 thermal cycles consisting of 150° C. for 2 hours and −40° C. for 2 hours was given.

The ASTM-1 dumbbells obtained t through molding cycle [A] were treated using Sunshine Weatherometer under the conditions of arc current of 50 A/arc voltage of 80 V, rain 12 minutes/cycle 60 minutes/room temperature of 90° C., for 40 days.

Further, test samples obtained in the same manner as in Example 1 except that the aromatic polyester was polyethylene terephthalate with a relative viscosity of 1.35 (extrusion and molding temperature of 285° C., mold temperature in molding of 120° C.) (Example 26) and test samples obtained in the same manner as in Example 1 except that the aromatic polyester was polycyclohexanedimethylene terephthalate with a relative viscosity of 1.42 (extrusion and molding temperature of 300° C., mold temperature in molding of 120° C.) (Example 27) were also tested in the same manner as described above. The results are shown in Table 4 in summary.

TABLE 4

| | | | | | Molding Cycle [A] | | |
| | | | | | Non-Treated Article | | |
| | | Elastomer | | Epoxy Compound | Minimum | | Impact |
| | Aromatic Polyester | No. | Amount (parts by wt) | No. | Amount (parts by wt) | Injection Pressure (kg/cm$^2$) | Tensile Strength (kg/cm$^2$) | Strength (kg · cm/cm) |
|---|---|---|---|---|---|---|---|---|
| Example No. | | | | | | | | |
| 21 | PBT | A-1 | 3    | B-1 | 1.0   | 62 | 915  | 13.0 |
| 22 | PBT | A-1 | 10   | B-1 | 1.0   | 58 | 865  | 15.5 |
| 23 | PBT | A-1 | 20   | B-1 | 1.0   | 64 | 825  | 17.5 |
| 24 | PBT | A-5 | 10   | B-1 | 0.5   | 51 | 845  | 15.0 |
| 25 | PBT | A-5 | 10   | B-1 | 1.0   | 49 | 840  | 15.5 |
| 26 | PET | A-1 | 10   | B-1 | 0.5   | 32 | 975  | 16.5 |
| 27 | PCT | A-1 | 10   | B-1 | 0.5   | 37 | 1015 | 15.5 |
| Comp. Ex. | | | | | | | | |
| 14 | PBT | A-1 | 0.1  | B-1 | 1.0   | 64 | 1035 | 7.0  |
| 15 | PBT | A-1 | 10   | B-1 | 0.001 | 59 | 870  | 14.0 |
| 16 | PBT | A-1 | 10   | B-4 | 1.0   | 58 | 875  | 13.5 |

| | Molding Cycle [A] | | | |
| | Boiled Water-Treated Article | | Heat Cycle-Treated Article | Weatherometer-Treated Article |
| | Tensile Strength Kg/cm$^2$) | Impact Strength (kg · cm/cm) | Tensile Strength (kg/cm$^2$) | Tensile Strength (kg/cm$^2$) |
|---|---|---|---|---|
| Example No. | | | | |
| 21 | 860 | 11.5 | 830 | 835 |
| 22 | 805 | 12.0 | 670 | 740 |
| 23 | 695 | 13.5 | 725 | 730 |
| 24 | 735 | 13.5 | 660 | 680 |
| 25 | 775 | 14.0 | 720 | 720 |
| 26 | 895 | 15.5 | 885 | 880 |
| 27 | 960 | 13.5 | 865 | 775 |
| Comp. Ex. | | | | |
| 14 | 965 | 6.5 | 320 | 855 |
| 15 | 395 | 9.5 | 315 | 555 |
| 16 | 405 | 5.5 | 410 | 575 |

| | Molding Cycle [B] | | | |
| | Non-Treated Article | | Boiled Water-Treated Article | |
| | Minimum Injection Pressure (Kg/cm$^2$) | Tensile Strength (Kg/cm$^2$) | Impact Strength (kg · cm/cm) | Tensile Strength (kg/cm$^2$) | Impact Strength (kg · cm/cm) |
|---|---|---|---|---|---|
| Example No. | | | | | |

TABLE 4-continued

| | | | | | |
|---|---|---|---|---|---|
| 21 | 63 | 890 | 12.5 | 850 | 11.5 |
| 22 | 59 | 855 | 14.5 | 835 | 11.0 |
| 23 | 62 | 830 | 17.0 | 805 | 11.5 |
| 24 | 54 | 825 | 14.5 | 800 | 11.0 |
| 25 | 52 | 835 | 15.5 | 825 | 12.0 |
| 26 | 30 | 930 | 13.5 | 885 | 11.0 |
| 27 | 27 | 835 | 12.5 | 805 | 10.5 |
| Comp. Ex. | | | | | |
| 14 | 63 | 930 | 6.5 | 885 | 5.5 |
| 15 | 59 | 865 | 13.5 | 375 | 5.0 |
| 16 | 58 | 875 | 12.5 | 395 | 4.5 |

[Abbreviation]
PBT: polybutylene terephthalate,
PET: polyethylene terephthalate,
PCT: polycyclohexanedimethyl terephthalate

EXAMPLES 28–30

Melt-mixing, molding and evaluation of the properties of the resulting products were conducted as in Example 21 using 100 parts by weight of polybutylene terephthalate with a relative viscosity of 1.45, 20 parts by weight of glass fibers (3 mm length, chopped strand type), 10 parts by weight of elastomer (A-1), 1.0 part by weight of epoxy compound (B-1), and the following hindered phenol compound (C-1) and/or the following sulfur-containing ester compound (C-2) in the amount shown in Table 5. The results are shown in Table 5.

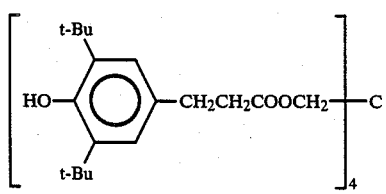

C-1:

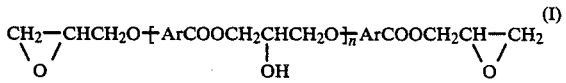

C-2: S(CH$_2$CH$_2$COOC$_{12}$H$_{25}$)$_2$

TABLE 5

| | | Molding Cycle [A] | | | |
|---|---|---|---|---|---|
| | | Non-Treated Article | | Boiled Water-Treated Article | |
| Example No. | Additive (parts by wt) | Minimum Injection Pressure (kg/cm$^2$) | Tensile Strength (kg/cm$^2$) | Impact Strength (kg·cm/cm) | Tensile Strength (kg/cm$^2$) | Impact Strength (kg·cm/cm) |
| 28 | C-1 (0.2) | 56 | 885 | 16.0 | 825 | 14.5 |
| 29 | C-1 (0.2) | 55 | 870 | 16.0 | 835 | 15.5 |
| 30 | C-1 (0.2) C-2 (0.2) | 53 | 890 | 16.5 | 850 | 15.5 |

| | Molding Cycle [A] | |
|---|---|---|
| Example No. | Heat Cycle-Treated Article Tensile Strength (Kg/cm$^2$) | Weatherometer-Treated Article Tensile Strength (kg/cm$^2$) |
| 28 | 745 | 820 |
| 29 | 740 | 825 |
| 30 | 755 | 830 |

| | Molding Cycle [B] | | | | |
|---|---|---|---|---|---|
| | Non-Treated Article | | | Boiled Water-Treated Article | |
| Example No. | Minimum Injection Pressure (kg/cm$^2$) | Tensile Strength (kg/cm$^2$) | Impact Strength (kg·cm/cm) | Tensile Strength (kg/cm$^2$) | Impact Strength (kg·cm/cm) |
| 28 | 56 | 880 | 15.0 | 815 | 13.5 |
| 29 | 54 | 870 | 15.5 | 830 | 13.0 |
| 30 | 52 | 895 | 16.0 | 855 | 13.5 |

What is claimed is:

1. A polyester composition comprising:
   (a) 100 parts by weight of an aromatic polyester;
   (b) 0.005–10 parts by weight of an epoxy compound of the formula (I):

$$CH_2\!\!-\!\!CHCH_2O\!\!+\!\!ArCOOCH_2CHCH_2O\!\!\xrightarrow{}_{\!\!n}\!\!ArCOOCH_2CH\!\!-\!\!CH_2 \quad (I)$$

(with epoxide groups at ends and OH in middle)

(wherein Ar means C$_6$–C$_{20}$ aromatic group or C$_6$–C$_{20}$ alicyclic group, n means an integer of 0–20); and
   (c) 1–70 parts by weight of at least one elastomer which has at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, the elastomer having a tensile modulus of 1-6,000 kg/cm$_2$.

2. The composition of claim 1, wherein the aromatic polyester has a relative viscosity of 1.10-2.0 at 25° C. when measured as a 0.5% solution in o-chlorophenol.

3. The composition of claim 1, wherein the aromatic polyester is a polyalkylene terephthalate.

4. The composition of claim 1, wherein the aromatic polyester is a polycyclohexanedimethylene terephthalate.

5. The composition of claim 3, wherein the polyalkylene terephthalate is polybutylene terephthalate or polyethylene terephthalate.

6. The composition of claim 1, wherein the Ar in the formula (I) is phenylene group, biphenylene group or naphthylene group.

7. The composition of claim 1, wherein the Ar in the formula (I) is 1,4-phenylene group.

8. The composition of claim 1, wherein the content of the epoxy compound is 0.05-5 parts by weight.

9. The composition of claim 1, wherein the content of the epoxy compound is 0.2-3 parts by weight.

10. The composition of claim 1, wherein the elastomer has a glass transition temperature of not higher than 0° C.

11. The composition of claim 1, wherein the tensile modulus of the elastomer is 5-2,000 kg/cm$^2$.

12. The composition of claim 1, wherein the content of the elastomer is 3-40 parts by weight.

13. The composition of claim 1, wherein the elastomer is selected from the group consisting of:
   (i) glycidyl group-containing copolymers of an α-olefin and a glycidyl ester of an α,β-unsaturated acid;
   (ii) modified ethylene-based copolymers obtained by graft copolymerizing an ethylene-based polymer with 0.01 to 10% by weight of an unsaturated carboxylic acid or a derivative thereof;
   (iii) ethylene-based random copolymers of ethylene and an unsaturated carboxylic acid or a derivative thereof;
   (iv) acrylic polymers which may or may not contain a diene-based polymer; and
   (v) conjugated diene-based polymers having at least one functional group selected from the group consisting of hydroxyl group, carboxylic group, acid anhydride group, amino group and cyano group.

14. The composition of claim 13, wherein the α-olefin in the glycidyl group-containing copolymer is ethylene and the glycidyl ester of the α, β-unsaturated acid is glycidyl methacrylate and/or glycidyl acrylate.

15. The composition of claim 14, wherein at least one unsaturated monomer selected from the group consisting of C$_1$-C$_{10}$ alkyl acrylate, C$_1$-C$_{10}$ alkyl methacrylate and vinyl acetate is further copolymerized to the glycidyl group-containing copolymer.

16. The composition of claim 13, wherein the content of the glycidyl ester of the α, β-unsaturated acid in the glycidyl group-containing copolymer is 0.1-50% by weight.

17. The composition of claim 13, wherein the content of the glycidyl ester of the α,β-unsaturated acid in the glycidyl group-containing copolymer is 1-25% by weight.

18. The composition of claim 13, wherein the unsaturated carboxylic acid or the derivative thereof in the modified ethylene-based copolymer is at least one member selected from the group consisting of C$_3$-C$_{20}$ unsaturated carboxylic acids, acid anhydrides thereof, glycidyl esters thereof, imides thereof, amides thereof and metal salts thereof.

19. The composition of claim 13, wherein the ethylene-based polymer in the modified ethylene-based copolymer is selected from the group consisting of (A) copolymers of ethylene and propylene and/or butene-1; (B) copolymers of ethylene, propylene and/or butene-1 and C$_6$-C$_{20}$ non-conjugated diene; (C) copolymers of ethylene and C$_1$-C$_{10}$ alkylacrylate or C$_1$-C$_{10}$ alkylmethacrylate; (D) copolymers of ethylene and saponified or non-saponified vinyl acetate; and (E) hydrogenated styrene-butadiene block copolymers or hydrogenated styrene-isoprene block copolymers.

20. The composition of claim 13, wherein the ethylene-based polymer in the modified ethylene-based copolymer is selected from the group consisting of ethylene/propylene copolymers, ethylene/propylene copolymers in which at least one non-conjugated diene of 1,4-hexadiene, dicyclopehtadiene, or ethylidene norbornane is further copolymerized, ethylene/butene-1 copolymers, ethylene/butene-1 copolymers in which at least one non-conjugated diene of 1,4-hexadiene, dicyclopehtadiene, or ethylidene norbornane is further copolymerized, ethylene/methyl acrylate copolymers, ethylene/ethyl acrylate copolymers, ethylene/butyl acrylate copolymers, ethylene/methyl methacrylate copolymers, ethylene/vinyl acetate copolymers, saponified ethylene/vinyl acetate copolymers, hydrogenated styrene-butadiene block copolymers and hydrogenated styrene-isoprene block copolymers.

21. The composition of claim 13, wherein the unsaturated carboxylic acid or the derivative thereof in the modified ethylene-based copolymer is selected from the group consisting of acrylic acid, methacrylic acid, meleic acid, fumaric acid, itaconic acid, crotonic acid, tetrahydrophthalic acid, 5-norbornane-2,3-dicarboxylic acid, methylendomethylene tetrahydrophthalic acid and acid anhydrides, glycidyl esters and imides thereof.

22. The composition of claim 13, wherein the unsaturated carboxylic acid or the derivative thereof in the ethylene-based random copolymer is acrylic acid, methacrylic acid or a metal salt or a C$_1$-C$_8$ alkyl ester thereof.

23. The composition of claim 13, wherein the acrylic polymer which may contain the diene-based polymer is a graft-copolymer which is obtained by graft copolymerizing at least one unsaturated monomer selected from the group consisting of acrylic acid, methacrylic acid, C$_1$-C$_8$ alkylesters and glycidyl ester thereof, aromatic monovinyls and cyanated monovinyls with a graft base containing as its major constituent a C$_1$-C$_8$ alkylacrylate or a C$_1$-C$_8$ alkylmethacrylate, which may or may not contain polybutadiene.

24. The composition of claim 13, wherein the conjugated diene-based polymer is selected from the group consisting of polybutadiene, butadiene/styrene copolymers, butadiene-styrene block copolymers, styrene-isoprene block copolymers, butadiene/acrylonitrile copolymers obtained by copolymerizing or graft copolymerizing an unsaturated monomer having hydroxyl group, carboxyl group, acid anhydride group or amino group.

25. The composition of claim 1, wherein the elastomer has a melt flow rate of 0.1-100 g/10 minutes which is determined in accordance with ASTM D1238.

26. The composition of claim 1 further comprising 0.01-5 parts by weight of a hindered phenol derivative and/or a sulfur-containing ester compound.

27. The composition of claim 26, wherein the hindered phenol-based compound has a structural unit represented by the formula (II):

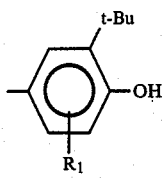  (II)

(wherein $R^1$ means $C_1$–$C_{10}$ alkyl) and has a molecular weight not less than 500.

28. The composition of claim 26, wherein the sulfur-containing ester compound is represented by formula (III) or (IV):

$$S-R^2COOR^3)_2 \quad (III)$$

$$(R^5SR^4COOCH_2)_4C \quad (IV)$$

(wherein $R^2$ and $R^4$, the same or different, mean $C_1$–$C_{10}$ alkyl group, and $R^3$ and $R^4$, the same or different, mean $C_3$–$C_{40}$ alkyl group)

29. The composition of claim 1 further comprising a filler in the amount of 50% by weight with respect to the whole composition.

30. The composition of claim 29, wherein the filler is selected from the group consisting of glass fibers, carbon fibers, metal fibers, aramide fibers, potassium titanate whiskers, glass flakes, glass beads, wallastenite, gypsum fibers, clay, mica, talc, sepiolite, titanium oxide, aluminum oxide, calcium carbonate and barium carbonate.

31. A process of producing a polyester composition comprising the steps of:
    blending in dry state
    (a) 100 parts by weight of an aromatic polyester;
    (b) 0.005–10 parts by weight of an epoxy compound of the formula (I):

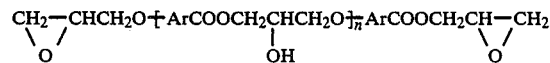

(wherein Ar means $C_6$–$C_{20}$ aromatic group or $C_6$–$C_{20}$ alicyclic group, n means an integer of 0–20); and
    (c) 1–70 parts by weight of at least one elastomer which has at least one functional group selected from the group consisting of epoxy groups, carboxyl group, carboxylate ester groups, carboxylic acid amide groups, acid anhydride group, imide groups, carboxylate salt groups, hydroxyl group, amino group and cyano group, the elastomer having a tensile modulus of 1–6,000 kg/cm$^2$; and
    thereafter melting and stirring the resulting mixture at temperature higher than the melting point of the aromatic polyester by 5°–50° C.

* * * * *

UNITED STATES PATENT AND TRADEMARK OFFICE
CERTIFICATE OF CORRECTION

PATENT NO. : 4,879,328

DATED : 11/7/89

INVENTOR(S) : Hiroo Karasawa; Kiichi Kometani; Kiyomi Okita

It is certified that error appears in the above-identified patent and that said Letters Patent is hereby corrected as shown below:

Column 9, line 7, change "$S-R_2COOR_3)_2$" to $--S-(R_2COOR_3)_2--$;  (III)

line 9, change "$(R_5SR_4COOCH_2-_4C$" to $--(R_5SR_4COOCH_2-)_4C--$.  (IV)

Claim 28, line 19, change "$S-R^2COOR^3)_2$" to $--S-(R^2COOR^3)_2--$.

Signed and Sealed this

Thirtieth Day of April, 1991

Attest:

HARRY F. MANBECK, JR.

Attesting Officer

Commissioner of Patents and Trademarks